(12) United States Patent
Welschof et al.

(10) Patent No.: US 9,174,521 B2
(45) Date of Patent: Nov. 3, 2015

(54) DRIVE TRAIN OF A MOBILE MACHINE

(75) Inventors: Bernward Welschof, Grossostheim (DE); Lukas Krittian, Aschaffenburg (DE)

(73) Assignee: Linde Hydraulics GmbH & Co. KG, Aschaffenburg (DE)

( * ) Notice: Subject to any disclaimer, the term of this patent is extended or adjusted under 35 U.S.C. 154(b) by 664 days.

(21) Appl. No.: 13/528,245

(22) Filed: Jun. 20, 2012

(65) Prior Publication Data
US 2013/0014500 A1    Jan. 17, 2013

(30) Foreign Application Priority Data
Jul. 11, 2011    (DE) .......................... 10 2011 107 061

(51) Int. Cl.
| | | |
|---|---|---|
| *F15B 13/00* | (2006.01) | |
| *B60K 6/12* | (2006.01) | |
| *F15B 1/027* | (2006.01) | |
| *F15B 1/02* | (2006.01) | |

(52) U.S. Cl.
CPC . *B60K 6/12* (2013.01); *F15B 1/024* (2013.01); *F15B 1/027* (2013.01); *F15B 1/0275* (2013.01); *B60W 2300/17* (2013.01); *B60Y 2200/145* (2013.01); *Y02T 10/6208* (2013.01)

(58) Field of Classification Search
CPC ................. B60K 6/12; B60Y 2400/13; B60Y 2200/145; Y02T 10/6208; F15B 1/024; F15B 1/027; F15B 1/0275; B60W 2300/17

USPC ............................................................ 60/414
See application file for complete search history.

(56) References Cited

U.S. PATENT DOCUMENTS

| | | | |
|---|---|---|---|
| 5,319,932 A * | 6/1994 | Roche .............................. | 60/419 |
| 8,312,715 B2 | 11/2012 | Rea et al. | |
| 2006/0108860 A1* | 5/2006 | Stragier .......................... | 303/15 |
| 2009/0008174 A1* | 1/2009 | Tikkanen et al. ............. | 180/165 |
| 2009/0084102 A1* | 4/2009 | Mueller et al. .................. | 60/413 |

FOREIGN PATENT DOCUMENTS

| | | |
|---|---|---|
| DE | 3247335 A1 | 9/1983 |
| DE | 102008028547 A1 | 12/2009 |

* cited by examiner

*Primary Examiner* — Dwayne J White
*Assistant Examiner* — Logan Kraft
(74) *Attorney, Agent, or Firm* — The Webb Law Firm

(57) ABSTRACT

A drive train of a vehicle has a drive motor and a traction drive driven by the drive motor. A hydraulic work system has at least one hydraulic pump driven by the drive motor. To deliver torque into the drive train and/or to absorb torque from the drive train, the drive train is provided with an additional hydraulic machine which can be placed in communication with a hydraulic pressure accumulator and/or a tank and can be operated as a pump and a motor in the same direction of rotation. The hydraulic machine has an inlet connection and an outlet connection and a switching valve device is provided to control the connection of the inlet connection and the outlet connection with the pressure accumulator or the tank.

12 Claims, 1 Drawing Sheet

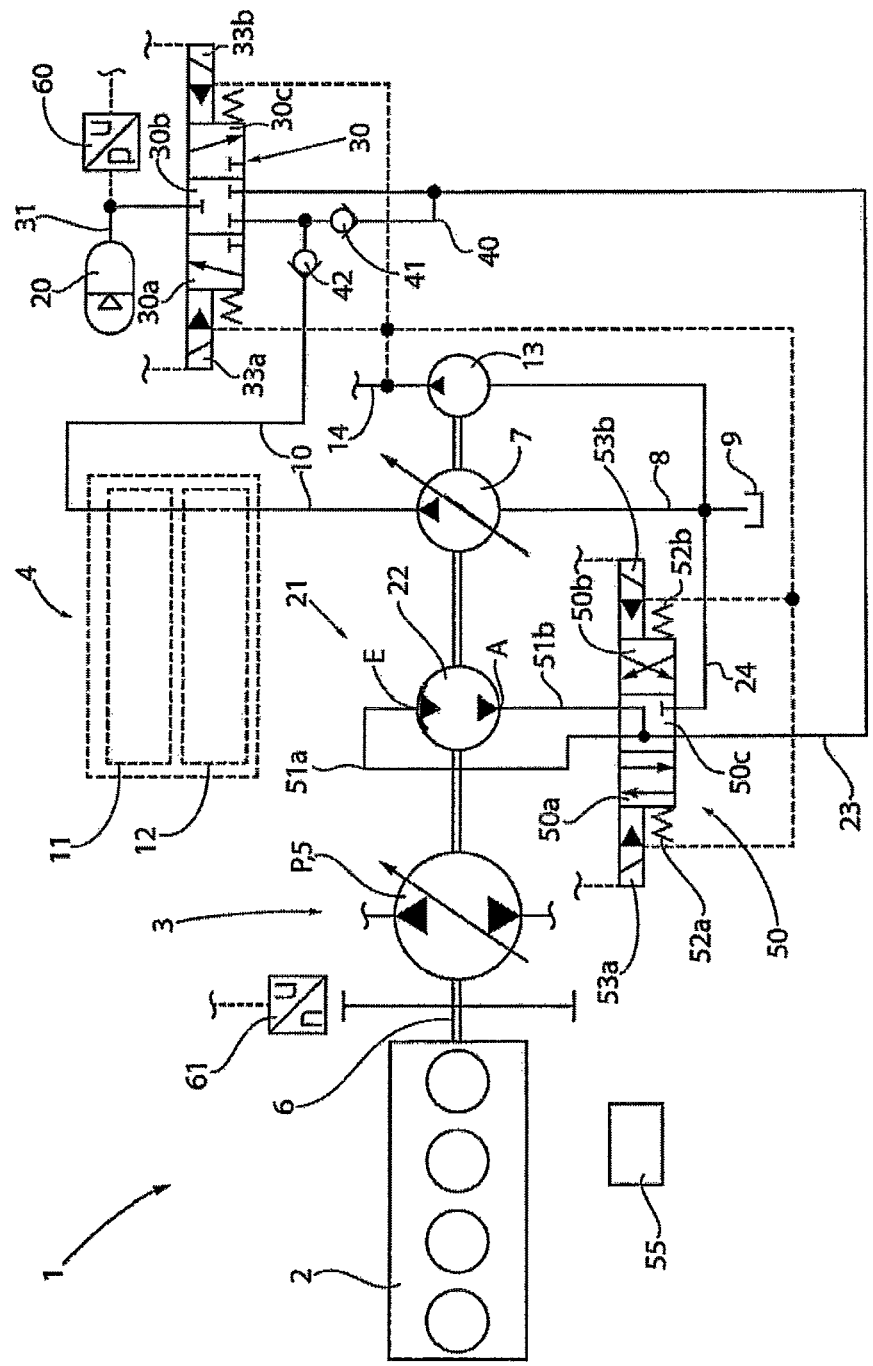

DRIVE TRAIN OF A MOBILE MACHINE

CROSS-REFERENCE TO RELATED APPLICATION

This application claims priority to German Patent Application No. DE 10 2011 107 061.7, filed Jul. 11, 2011, which is herein incorporated by reference in its entirety.

BACKGROUND OF THE INVENTION

1. Field of the Invention

This invention relates to a drive train of a vehicle, in particular of a mobile machine, with a drive motor, in particular an internal combustion engine, and a traction drive driven by the drive motor. The traction drive has a primary unit driven by the drive motor and a hydraulic work system is driven by the drive motor. The hydraulic work system has at least one hydraulic pump driven by the drive motor. When the vehicle is operated in deceleration or braking, the hydraulic pump of the hydraulic work system delivers into a hydraulic pressure accumulator to recover energy.

2. Description of the Current Technology

Self-propelled machines, in particular industrial trucks, agricultural machines, forestry machines and construction machinery, for example, excavators, wheeled loaders and telescopic loaders, tractors, combine threshers, forage harvesters, and sugar beet or potato diggers, have a drive train with a drive motor that is generally in the form of an internal combustion engine which drives a traction drive and a hydraulic work system for the work functions of the mobile machine. There is at least one hydraulic pump driven by the drive motor which supplies the hydraulic work system.

A drive train of this type can be provided with a hydraulic pressure accumulator and a hydraulic machine unit that is in communication with the pressure accumulator to deliver torque into the drive train and to absorb torque from the drive train. As a result of the charging of the pressure accumulator during the deceleration or braking of the traction drive and/or the lowering of a load, the kinetic energy of the vehicle and/or the potential energy of a raised load can be recovered. By operating the hydraulic machine unit as a motor with the hydraulic fluid from the pressure accumulator, in addition to the internal combustion engine, a torque can be delivered into the drive train in the form of a booster drive. The hydraulic machine unit driven by the pressure accumulator thereby forms a hydrostatic booster drive of the drive train and makes possible in particular a booster drive in which, when there is a demand for power, the drive motor is assisted by the additional torque which is delivered by the hydraulic machine unit into the drive train. The energy recovered in the pressure accumulator during the deceleration or braking of the vehicle can again be made available by the hydraulic machine unit to the drive train when the machine is re-accelerated, for example, so that the energy for the acceleration of the machine need no longer be supplied exclusively by the drive motor.

The hydrostatic booster drive formed by the pressure accumulator and the hydraulic machine unit therefore make it possible to reduce the fuel consumption of the internal combustion engine. In addition, the power of the internal combustion engine can be reduced as a result of the presence of the hydrostatic booster drive. A downsizing of the internal combustion engine results in advantages, in particular in compliance with the exhaust standards imposed by law on the internal combustion engine.

The hydrostatic booster drive formed by the pressure accumulator and the hydraulic machine unit can also be used as a hydraulic starter of a drive motor which is in the form of an internal combustion engine to reduce the fuel consumption, in connection with a start-stop function for the internal combustion engine, by shutting down the idling internal combustion engine during pauses or interruptions in the work and by automatically starting it up again in the event of a demand for torque by a work function or by the traction drive.

DE 10 2008 028 547 A1 describes a drive train of a mobile machine in which energy is recovered during deceleration and braking by charging a hydraulic pressure accumulator. The hydraulic machine unit, which is in communication with the hydraulic pressure accumulator, can be used as a booster drive and as a hydraulic starter of the internal combustion engine. The hydraulic machine unit in DE 10 2008 028 547 A1 connected with the pressure accumulator is in the form of a radial piston machine that is operated in an open circuit and takes up relatively little space in the axial direction, is located in the drive train between the drive motor and the primary unit of the traction drive, and is simultaneously used for the supply of the hydraulic work system. When the machine is decelerated or braked, the radial piston machine that is used to supply the hydraulic work system functions as a pump and charges the pressure accumulator. When the radial piston machine is operated as a motor, it is driven by the hydraulic fluid from the pressure accumulator to provide a boost to the drive motor or so that the radial piston machine can be used as the starter of the drive motor which is in the form of an internal combustion engine. In DE 10 2008 028 547 A1, the radial piston machine is connected on a first side to the pressure accumulator and on a second side to the tank. However, a radial piston machine of this type that can be operated as a pump and motor in an open circuit to supply the hydraulic work system requires a great deal of construction effort and expense to manufacture to make it possible to operate the machine as a pump and a motor, since it must be possible to adjust the radial piston machine across the null point in both directions to achieve the reversal of delivery direction necessary for operation as a pump or as a motor. The special design of the hydraulic pump of the hydraulic work system as a radial piston machine that can be adjusted in both directions and its simultaneous utilization as a hydraulic machine of the hydrostatic booster drive therefore means that a high level of effort and expense is required in the design and construction of the drive system.

DE 32 47 335 describes a drive train with a hydrostatic booster drive which is formed by a hydraulic pressure accumulator and a hydraulic work pump operated in an open circuit. When the vehicle is decelerated, the pressure accumulator can be charged with hydraulic fluid by the hydraulic work pump and energy can be recovered. To feed a booster torque into the drive train, the pressure accumulator is connected with the suction side of the hydraulic work pump, as a result of which the hydraulic work pump operates as a motor. A hydraulic work pump of this type operating in an open circuit such as, for example, an axial piston pump with a fixed displacement or variable volumetric displacement which is in communication by the suction connection with the tank, is generally designed for a high suction limit speed. The suction connection with the suction channel thereby has a correspondingly large cross section, whereby during operation as a motor, in which the pressure accumulator is connected with the suction connection of the hydraulic work pump, the housing generally does not have sufficient strength to withstand the pressures required to achieve the desired additional torque in the drive train. In addition, when there is a connection between the suction connection of the hydraulic work pump with the pressure accumulator when the hydraulic work pump is being operated as a motor, it is necessary to make the suction connection and the suction channel resistant to high pressure, which further increases the time, effort, and expense involved in the design and construction of the pump.

In DE 10 2008 028 547 A1 and DE 324 47 335 A1, when the machine is decelerating or braking, during which process the hydraulic pump of the hydraulic work system delivers into the pressure accumulator, the brake power and thus the kinetic energy to be extracted in the pressure accumulator is determined from the volumetric displacement flow of the hydraulic pump and the pressure in the hydraulic accumulator. In a machine with a hydrostatic traction drive in a closed circuit, during deceleration and braking there is a change in pressure in the hydrostatic traction drive, as a result of which the drive motor, which is generally an internal combustion engine, is driven by the traction drive and its speed of rotation is increased when it is operating in the tractor mode. The volumetric displacement flow delivered by the hydraulic pump of the hydraulic work system during deceleration and braking thereby corresponds to the set delivery quantity and the speed of the drive motor operating in tractor mode. In machines of this type, the hydraulic pump of the hydraulic work system is limited to the medium pressure range and the maximum volumetric displacement of the hydraulic pump is adapted to and designed for the requirements of the hydraulic work system.

In particular on mobile machines with a high operational weight, such as on the mobile machines described in DE 10 2008 028 547 A1 and DE 32 47 335 A1, the maximum power installed on the hydraulic pump of the hydraulic work system may no longer be sufficient to absorb the kinetic energy during a deceleration or braking of the machine and to achieve the desired deceleration.

SUMMARY OF THE INVENTION

Therefore, it is an object of this invention is provide a drive train of the general type described above but which requires less construction effort and expense and with which an improved deceleration and braking operation of the machine can be achieved.

The invention teaches that this object can be accomplished by providing the drive train with an additional hydraulic machine unit which is designed to deliver torque into the drive train and/or to absorb torque from the drive train, which additional hydraulic machine unit can be placed in communication with the hydraulic pressure accumulator and a tank and is in the form of at least one hydraulic machine that can be operated as a pump and a motor in the same direction of rotation. The additional hydraulic machine has an inlet connection and an outlet connection. A switching valve device is provided to control the connection of the inlet connection and of the outlet connection with the pressure accumulator or the tank.

A teaching of the invention is therefore to provide, in addition to the hydraulic pump of the hydraulic work system in the drive train, at least one additional hydraulic machine unit in the form of a hydraulic machine that be operated as a pump or a motor in the same direction of rotation, which can be connected with the pressure accumulator and a tank, and when operated as a motor makes it possible to deliver torque into the drive train, for example in the form of a booster drive to assist the drive motor in an acceleration process of the machine and/or as a hydraulic starter for the drive motor, and when operated as a pump, by absorbing torque from the drive train, to generate additional braking torque and thus additional braking power. To reverse the direction of delivery on this hydraulic machine for operation as a motor and a pump with the same direction of rotation, the invention provides a switching valve device by means of which the connection of an inlet connection and of an outlet connection with the pressure accumulator or the tank, respectively, can be controlled. A hydraulic machine that can be controlled in this manner by a switching valve device for operation as a pump or a motor requires little additional construction effort and expense. Because no modifications and adaptations of the hydraulic pump of the hydraulic work system are necessary on the drive train, the additional integration of a hydraulic machine according to the invention requires little additional effort to provide a hydrostatic booster drive, which in connection with the recovery of the braking energy makes it possible to use the invention as a booster drive and/or a hydraulic starter for the drive motor. One significant advantage of the invention is that with the additional hydraulic machine of the invention, when the mobile machine is being decelerated or braked, the operation of the hydraulic machine as a pump can be used as a hydraulic retarder, so that in the drive train, in addition to the braking power of the hydraulic pump of the hydraulic work system, an additional braking torque can be built up in the drive train by means of the hydraulic machine and thus an additional braking power can be achieved. In a drive train according to the invention with a hydrostatic traction drive in a closed circuit, using the additional hydraulic machine according to the invention, in particular on mobile machines with a high operational weight, it is thereby easily possible during braking operation to absorb additional kinetic energy to achieve the desired deceleration of the vehicle without the need for adaptations of the hydraulic pump of the hydraulic work system.

In one advantageous embodiment of the invention, the switching valve device has a motor operation position for the delivery of torque from the hydraulic machine into the drive train, in which the inlet connection is connected with the pressure accumulator and the outlet connection is connected with the tank. When the switching valve device is in the motor operating position, it is easily possible to establish a connection of the inlet connection of the hydraulic machine with the pressure accumulator and of the outlet connection of the hydraulic machine with the tank, to switch a flow of hydraulic fluid from the pressure accumulator to the hydraulic machine and to achieve an operation of the hydraulic machine with hydraulic fluid from the pressure accumulator. When the hydraulic machine of this type is being operated as a motor, it is easily possible, by means of the hydraulic machine, to deliver a torque boost into the drive train, so that when the hydraulic machine is used, a drive boost can be achieved, for example, during an acceleration of the mobile machine and/or a drive motor in the form of an internal combustion engine can be started hydraulically.

If, as in one advantageous realization of the invention, the switching valve device has a pumping operating position for the absorption of torque from the drive train by the hydraulic machine, in which the inlet connection is in communication with the tank and the outlet connection is in communication with the pressure accumulator, it is easily possible, while leaving the direction of rotation of the hydraulic machine the same, to establish, for pumping operation, a communication between the inlet connection of the hydraulic machine and the tank and between the outlet connection of the hydraulic machine with the pressure accumulator. In pumping operation of this type, the hydraulic machine, during the deceleration or braking of the vehicle, represents a hydraulic retarder and delivers hydraulic fluid into the pressure accumulator against the current accumulator pressure in the pressure accumulator. The hydraulic machine is thereby driven by the drive train, so that the hydraulic machine absorbs a torque from the drive train and makes it possible to apply an additional braking moment to the drive train.

In one advantageous embodiment of the invention, the switching valve device has a neutral circulation position in which the inlet connection is in communication with the outlet connection in unpressurized circulation. When the drive motor is running, the hydraulic machine is driven by the drive motor. If the hydraulic machine is not to be operated either as a motor or as a pump, e.g. during travel of the mobile machine or during the operation of the hydraulic work system, the unpressurized and therefore low-loss circulation in the neutral circulation position of the circulating valve device can result in low losses through the drive of the hydraulic machine. In addition, by means of the unpressurized circulation, a circulation of hydraulic fluid can be achieved in the hydraulic machine for the cooling and lubrication of the hydraulic machine which is driven when the drive motor is running.

In one embodiment of the invention, the switching valve device is in the form of a control valve, in particular a longitudinal slide valve, which is connected to a connecting line which is in communication with the pressure accumulator, to a tank line which is in communication with the tank, to an inlet line which is in communication with the inlet connection of the hydraulic machine, and to an outlet line which is in communication with the outlet side of the hydraulic machine. In the corresponding control position of such a control valve, which can be in the form of a four-connection, three position valve, it is easily possible and with little construction effort and expense to connect the inlet connection with the pressure accumulator or the tank and the outlet connection with the tank or the pressure accumulator, to achieve operation of the hydraulic machine as a motor or as a pump respectively, while the direction of rotation of the hydraulic machine remains the same, and to achieve an unpressurized circulation in the hydraulic machine. The control valve can thereby be in the form of a switch valve or a control valve that acts as a throttle in intermediate positions. With a control valve that acts as a throttle in intermediate positions, it is easily possible, when the hydraulic machine is being operated as a motor, to control the torque that is delivered into the drive train, and when the hydraulic machine is being operated as a pump, to control the additional braking moment of the hydraulic machine applied to the drive train.

In the drive train according to the invention, when the mobile machine is being decelerated or braked, whereby the primary unit of the traction drive is operating as a motor and the hydraulic pump of the hydraulic work system is driven by the primary unit of the traction drive, the hydraulic pump of the hydraulic work system charges the pressure accumulator to achieve a recovery of the braking energy.

In addition, by means of the hydraulic pump of the hydraulic work system, it is easily possible to charge the pressure accumulator with hydraulic fluid when the system is being driven by the drive motor. When the primary-side drive of the hydraulic pump of the hydraulic work system is being driven by the drive motor for the charging of the pressure accumulator, the pressure reservoir can also be charged outside such recovery periods, e.g. during travel, when the mobile machine is stationary or during work operations, so that periods in which the drive motor supplies more power than the consumers are consuming can be used for the charging of the pressure accumulator. Charging operations of this type are also possible if the pressure accumulator can be charged with small charging flows over a longer period, which makes it possible to achieve an energetically more advantageous charging operation of the pressure accumulator.

The hydraulic pump of the hydraulic work system is advantageously operated in an open circuit and is also advantageously in the form of a hydraulic pump with a variable volumetric displacement or a hydraulic pump with a fixed displacement volumetric displacement. With a hydraulic work pump which preferably has a variable volumetric displacement, it easily becomes possible to charge the pressure accumulator when there is excess energy, for example during the deceleration of the vehicle, by the recovery of kinetic energy or, depending on the operating conditions, by a drive by the drive motor.

To control the charging operation of the pressure accumulator by the hydraulic pump of the hydraulic work system and the discharge operation of the pressure accumulator, in which the pressure accumulator is in communication with the additional hydraulic machine to drive it, in one advantageous development of the invention, associated with the pressure accumulator is a charge/discharge valve which has a charging position in which a delivery line from the hydraulic pump of the hydraulic work system is in communication with an accumulator line that leads to the pressure accumulator, and a discharge position in which the accumulator line is in communication with a connecting line that leads to the switching valve device. It is possible with little additional construction effort and expense to construct the charge/discharge valve in the form of a longitudinal slide valve. The charge/discharge valve can thereby be a switch valve or a control valve that acts as a throttle in intermediate positions.

It is particularly advantageous if a branch line that leads to the delivery line branches off from the connecting line, in which branch line there is a shutoff valve device, in particular a non-return valve that opens in the direction toward the delivery line. By means of such a branch line, it is easily possible, when the charge/discharge valve is in the charging position, to charge the pressure accumulator with the hydraulic fluid delivered by the hydraulic machine operating as a pump. The shutoff valve in the branch line makes it possible, during the charging of the pressure accumulator, to prevent the hydraulic fluid delivered by the hydraulic pump of the hydraulic work system from flowing to the hydraulic machine.

In one advantageous development of the invention, there is a shutoff valve device in the delivery line upstream of the connection of the branch line, in particular a non-return valve that opens in the direction toward the charge/discharge valve. A shutoff valve of this type makes it possible to easily prevent the flow of hydraulic fluid delivered by the hydraulic machine operating as a pump to the pressure accumulator from flowing to the hydraulic pump of the hydraulic work system.

The hydraulic machine can be a variable unit, the displacement volume of which is unilaterally variable. A hydraulic machine of this type, for example a unilaterally variable axial piston machine operated in an open circuit, makes it possible with little construction effort and expense to vary the torque generated by the hydraulic machine when it is operating as a pump or absorbed by the hydraulic machine when it is operating as a motor by varying the volumetric displacement.

It is particularly advantageous in terms of low construction effort and expense if the hydraulic machine is a fixed displacement unit with a fixed volumetric displacement. A fixed displacement unit of this type is compact, as a result of which the hydraulic machine can be easily added and integrated into the drive train.

The hydraulic machine according to the invention can be a single-stroke or multiple-stroke radial piston machine. The hydraulic machine according to the invention can also be a vane-type hydraulic motor.

To keep the construction effort and expense as low as possible, it is particularly advantageous if the hydraulic machine according to the invention is a gearwheel machine, in particular a gearwheel motor. Gearwheel machines of this type can be internal gearwheel machines (crescent machines) or external gearwheel machines or G-rotor machines (gear rotor machines or annular gear machines). Gearwheel machines of this type can be easily operated as a pump or as a motor in the same direction of rotation. Gearwheel machines of this type are also compact in the axial direction, as a result of which such gearwheel machines in the form of hydraulic machines according to the invention can easily be integrated into the drive train, preferably between the primary unit of the traction drive and the hydraulic pump of the hydraulic work system.

BRIEF DESCRIPTION OF THE DRAWINGS

Additional advantages and details of the invention are explained in greater detail below with reference to the exemplary embodiment illustrated in the accompanying schematic FIGURE.

The FIGURE is a circuit diagram of a drive train 1 according to the invention of a mobile machine, which is not illustrated in any further detail, for example an industrial truck.

DESCRIPTION OF THE PREFERRED EMBODIMENTS

The drive train 1 according to the invention has a drive motor 2 in the form of an internal combustion engine, for example a diesel motor, a traction drive 3 driven by the drive motor 2, and a hydraulic work system 4 driven by the drive motor 2. The traction drive 3 is located in the drive train 1 in the first position downstream of the drive motor 2. The hydraulic work system 4 is located in the drive train 1 downstream of the traction drive 3.

In the illustrated exemplary embodiment, the traction drive 3 is a hydrostatic traction drive which includes a traction pump 5 with a variable volumetric displacement as the primary unit P, which for drive purposes is connected by means of a drive shaft 6 of the drive train 1 with the output shaft of the drive motor 2. The traction pump 5 is in communication with one or more hydraulic motors as secondary unit which are not illustrated in any further detail and have fixed or variable consumption volumes in the closed circuit, which are in an operative connection in a manner not illustrated in any further detail with the driven wheels of the mobile machine.

The traction drive 3 can alternatively be an electrical traction drive with an electric generator driven by the internal combustion engine 2 as the primary unit and one or more electrical traction motors as the secondary unit. The traction drive can also be a mechanical traction drive with a mechanical transmission, for example a multiple-gear transmission or a hydrostatic mechanical power-split transmission, or a torque converter transmission.

The hydraulic work system 4 comprises the work functions of the mobile machine, for example on an industrial truck a hydraulic work system for the actuation of load holding means on a mast, which generally comprises a lifting drive, a mast tilting drive and optionally one or more additional consumers, for example a lateral pusher device of the load holding means.

In the illustrated exemplary embodiment, the hydraulic work system 4 comprises at least one hydraulic pump 7 operated in an open circuit, which is connected for driving purposes with the drive shaft 6. The hydraulic pump 7 of the hydraulic work system 4 can be a pump with a fixed volumetric displacement or a pump with a variable volumetric displacement. The hydraulic pump 7 of the hydraulic work system 4 is preferably an axial piston pump employing a swashplate design with a unilaterally variable volumetric displacement.

The hydraulic pump 7 is in communication on the input side (the suction side) by means of a suction line 8 with a tank 9. A delivery line 10 which is connected on the output side (the delivery side) of the hydraulic pump 7 is connected to a control valve device 11, by means of which the hydraulic consumers of the hydraulic work system 4 which are not illustrated in any further detail can be controlled. The control valve device 11 preferably comprises one or more multi-way valves for the actuation of the consumers. In the illustrated exemplary embodiment there is also a priority valve 12, with which one of the consumers fed by the hydraulic pump 7, such as a hydraulic steering device, can be ensured of a priority supply of hydraulic fluid.

The drive train 1 further comprises a booster pump 13 in the form of a feeder pump which is located in the drive train 1 on the drive shaft 6 in last place behind the hydraulic pump 7. The booster pump 13 is a fixed displacement pump with a fixed volumetric displacement which is operated in an open circuit. For this purpose, the booster pump 13 is in communication on the input side by means of a suction line with the tank 9 and delivers into a feeder pressure line 14, to which the corresponding consumers of the feeder circuit are connected, such as, for example, the adjustment devices of the traction pump 5 and the hydraulic pump 7 as well as a feeder device for the hydrostatic traction drive and pilot valves for the control valves of the hydraulic work system and other control valves.

The drive train 1 according to the invention further comprises a hydraulic booster drive which includes a hydraulic pressure accumulator 20 and an additional hydraulic machine unit 21 which is in an operative connection with the drive train 1.

In the exemplary embodiment illustrated in the accompanying FIGURE, the hydraulic machine unit 21 is an individual machine which has one individual hydraulic machine 22.

It is also conceivable to provide multiple hydraulic machines as the hydraulic machine unit 21, such as, for example, making the hydraulic machine unit a dual machine having multiple hydraulic machines, such as a first hydraulic machine and a second hydraulic machine. According to the invention, the hydraulic machine 22 is a hydraulic machine that can be driven in one direction, and can therefore operate as a pump and a motor when operating in the same direction of rotation, and which when operating as a pump delivers torque into the drive train 1 and when operating as a motor absorbs torque from the drive train 1.

The hydraulic machine 22 in the illustrated exemplary embodiment is a fixed displacement-displacement unit with a fixed volumetric displacement and is a gearwheel machine such as a gearwheel motor, for example.

The hydraulic machine 22 has an inlet connection E that remains the same whether the machine is operating as a motor or a pump as well as an outlet connection A that remains the same whether it is operating as a motor or a pump. The hydraulic machine 22 is operated in an open circuit as a motor or a pump and can be placed in communication with the pressure accumulator 20 or the tank 9, respectively. The invention teaches that a switching valve device 50 is provided to control the respective connection of the inlet connection E and the outlet connection A with the pressure accumulator 20 and the tank 9 for operation as a pump or a motor, respectively.

The switching valve device 50 is a control valve, such as a longitudinal slide valve, for example, which is connected to a connecting line 23 that can be connected to the pressure accumulator 20 and to a tank line 24 that leads to the tank 9. Also connected to the switching valve device 50 is an inlet line 51a that leads to the inlet connection E of the hydraulic machine 22 and an outlet line 51b which is connected to the outlet connection A of the hydraulic machine 22.

The switching valve device 50 has a motor operation position 50a in which the hydraulic machine 22 is operated as a motor to deliver torque into the drive train 1. In the motor operation position 50a, the inlet line 51a is connected to the connecting line 23 and thus to the pressure accumulator 20 and the outlet line 51b is connected to the tank line 24. In the motor operation position 50a, therefore, a volume flow of hydraulic fluid is switched from the pressure accumulator 20 to the inlet side E of the hydraulic machine 22, so that the hydraulic machine 22 is operated as a motor with the hydraulic fluid from the pressure accumulator 20, and also gives a torque boost to the drive shaft 6 to supplement the torque supplied by the drive motor 2.

The switching valve device 50 further has a pumping operating position 50b in which the hydraulic machine 22 is operated as a pump which is driven by the drive shaft 6, so that the hydraulic machine absorbs a torque from the drive train 1. In the pumping position 50b, the inlet line 51a is connected to the tank line 24 and thus to the tank 9 and the outlet line 51b is connected to the connecting line 23 that can be connected to the pressure accumulator 20. In the pumping operating position 51b, the hydraulic machine 22 driven by means of the drive shaft 6 on the inlet side E sucks hydraulic fluid from the tank 9 and delivers it via the connecting line 23 into the pressure accumulator 20.

The switching valve device 50 also has a neutral circulation position 50c in the form of a neutral position, in which the inlet line 51a is connected with the outlet line 51b and is therefore short-circuited and therefore the hydraulic machine 22 is operated in unpressurized circulation. In the neutral circulation position 50c, a connection can be established with the connecting line 23.

The switching valve device 50 is acted upon by means of spring devices 52a, 52b to place it into the neutral circulation position 50c which is the neutral position and can be actuated by means of actuation devices 53a, 53b toward the motor operation position 50a as well as the pumping operation position 50b. In the illustrated exemplary embodiment, the switching valve device 50 can be actuated electrically, for which purpose an electronic control device 55 is provided.

In the illustrated drive train 1, the hydraulic pump 7 of the hydraulic work system 4 forms a charging device for the pressure accumulator 20. A charge/discharge valve 30 is provided to control the charging process of the pressure accumulator 20, which charge/discharge valve 30 has a charging position 30a in which the delivery line 10 of the hydraulic pump 7 is connected with an accumulator line 31 that leads to the pressure accumulator 20. The charge/discharge valve 30 also has a shutoff position 30b in which the connection of the delivery line 10 with the accumulator line 31 is shut off. To protect the pressure accumulator 20, the accumulator line 31 can also have a pressure limiting device which is not illustrated in any further detail, such as a pressure relief valve, for example.

To drive the hydraulic machine 22 with hydraulic fluid from the pressure accumulator 20, the charge/discharge valve 30 is provided with a discharge position 30c in which the accumulator line 31 is connected to the connecting line 23. In the shutoff position 30b and the charging position 30a of the charge/discharge valve 30, the connection of the accumulator line 31 with the connecting line 23 is shut off.

The charge/discharge valve 30 can be actuated electrically. Starting from the shutoff position 30b which is the center position, the charge/discharge valve 30 can be actuated by means of a first actuator device 33a toward the charging position 30a and by means of a second actuator device 33b toward the discharge position 30c. The actuator device 33a, 33b is connected with the electronic control device 55 for the actuation.

In the drive train 1 according to the invention, in addition to a charging of the pressure accumulator 20 by means of the hydraulic pump 7 of the hydraulic work system 4, the pressure accumulator 20 can also be charged with hydraulic fluid during pumping operation of the additional hydraulic machine 22. For this purpose, a branch line 40 branches off from the connecting line 23 to the delivery line 10. In the branch line 40 there is a shutoff valve device 41 which in the illustrated exemplary embodiment is a check valve that opens toward the delivery line 10. In the delivery line 10, upstream of the connection of the branch line 40, there is an additional shutoff valve device 42, which in the illustrated exemplary embodiment is in the form of a check valve that opens toward the charge/discharge valve 30.

A pressure sensor device 60 which is connected with the electronic control device 55 and measures the accumulator charging pressure of the pressure accumulator 20 is provided for the monitoring of the accumulator charging pressure.

To measure the speed of rotation of the internal combustion engine 2 there is also a speed sensor device 61 which is in communication with the electronic control device 55.

In the drive train 1, the hydraulic machine unit 21 formed by the hydraulic machine 22, the primary unit P formed by the pump 5 of the traction drive 3 and the hydraulic pump 7 of the hydraulic work system 4 and the optional booster pump 13 are located coaxially with respect to the drive shaft 6. The primary unit P of the traction drive 3 formed by the traction pump 5, as the consumer with the highest power requirement and the highest torque requirement, is connected directly with the output shaft of the drive motor 2 and is installed directly on the drive motor 2 in first position of the drive train 1. The hydraulic machine 22 of the hydraulic machine unit 21 is integrated into the drive train 1 in second position between the traction pump 5 which is the primary unit P of the traction drive 3 and the hydraulic pump 7. The hydraulic pump 7 is located in the drive train 1 in third position in the drive train 1. The optional booster pump 13, which has the lowest power requirement and the lowest torque requirement, is located in the fourth position of the drive train 1, after the hydraulic pump 7. Preferably the primary unit P of the traction drive 3 is connected with the hydraulic pump 7 of the hydraulic work system 4 by means of a flange connection, whereby the hydraulic machine 22, which is preferably in the form of a gearwheel machine, is integrated and installed in the vicinity of the flange connection between the primary unit P of the traction drive 3 and the hydraulic pump 7 of the hydraulic work system 4.

In the drive train 1, the pressure accumulator 20 is charged during a deceleration or braking process of the vehicle. As the vehicle decelerates or is braked by means of the traction drive 3, the primary unit P formed by the traction pump 5 operates as a motor which drives the hydraulic pump 7 of the hydraulic work system 4, so that the pressure accumulator 20 can be charged with hydraulic fluid by means of the charge/discharge valve 30 which is actuated into the charging position 30a. The hydraulic pump 7 therefore operates as a hydraulic retarder, which generates a braking moment on the drive shaft 6 and makes possible a recovery of the kinetic braking energy which is absorbed into the pressure accumulator 20. The kinetic energy to be absorbed by the pressure accumulator 20 during a deceleration or braking of the vehicle is determined by the volumetric flow of the hydraulic pump 7 and the accumulator pressure currently prevailing in the pressure accumulator 20. The volumetric flow of the hydraulic pump 7 is proportional to the speed of rotation of the drive shaft 6 and therefore the speed of rotation of the drive motor 2, which is an internal combustion engine in tractor operation, and the volumetric displacement set on the hydraulic pump 7.

In the drive train 1, during a deceleration or braking process, as a result of an actuation of the switching valve device 50 into a pumping operation position 50b which forms a retarder position, the additional hydraulic machine 22 continues to be operated as a hydraulic retarder to generate an additional braking moment on the drive shaft 6. In the pumping operating position 50b of the switching valve device 50, the hydraulic machine 22 which is operating as a pump by means of the drive shaft 6 delivers via the shutoff valve 41 into the branch line 40 and the charge/discharge valve 30 in the charging position 30a an additional volumetric flow at the current accumulator pressure from the tank into the pressure accumulator 20.

With the hydraulic machine 22, therefore, in addition to the installed output of the hydraulic pump 7 which is designed for the hydraulic work system 4, an additional braking power can be generated, whereby in particular vehicles with a high operational weight can be decelerated and braked at a desired rate of deceleration without increasing the volumetric displacement of the hydraulic pump 7 of the hydraulic work system.

Alternatively or in addition to a recovery of kinetic energy of the type described above, during a deceleration or braking operation by the operation of the hydraulic pump 7 and/or of the hydraulic machine 22, the pressure accumulator 20 can also be charged outside a recovery period when there is a hydraulic pump 7 which is driven by the internal combustion engine 2.

The hydraulic fluid in the pressure accumulator 20 delivered during a deceleration or braking process by the hydraulic pump 7 and the hydraulic machine 22 can, when the hydraulic machine 22 is operating as a motor, be used to assist the drive motor 2, for example during an acceleration phase of the vehicle or during the operation of the hydraulic work system 4. To operate the hydraulic machine 22 as a motor, the charge/discharge valve 30 is actuated into the discharge position 30c and the switching valve device 50 is actuated into the motor operation position 50a, so that hydraulic fluid flows into the hydraulic machine 22 on the inlet side E from the pressure accumulator 20 and drives it. The hydraulic machine 22 being operated as a motor thereby delivers into the tank 9 which is connected to the outlet side A. When the hydraulic machine 22 is being operated as a motor, therefore at the output of the hydraulic machine 22, an additional torque can be introduced into the drive train 1 to provide a drive boost. If, at the end of the acceleration process of the vehicle, sufficient hydraulic fluid is still present in the pressure accumulator 20, in steady-state traction operation at the final speed, the hydraulic machine 22 can continue to be operated and the torque generated by the hydraulic machine 22 being operated as a motor can be used for the traction operation.

The hydraulic machine 22 can also be used as a hydraulic starter for the drive motor 2 which is in the form of an internal combustion engine in a start-stop function of the internal combustion engine 2.

In normal operation of the drive train 1, the unactuated charge/discharge valve 30 is in the shutoff position 30b and the unactuated circulation valve device 50 is in the neutral circulation position 50c. As a result of the short-circuiting of the inlet side E with the outlet side A of the hydraulic machine 22 in the neutral circulation position 50c of the circulation valve device 50, an unpressurized circulation is achieved in the hydraulic machine, so that when the hydraulic machine 22 is driven by the drive motor 2 and the charging valve 30 is in the shutoff position 30b, a low-loss operation of the co-driven hydraulic machine 22 is achieved and a volumetric circulation of hydraulic fluid can be made available for cooling and lubrication of the hydraulic machine 22 which is being driven by the running internal combustion engine 2.

The drive train 1, with the hydraulic machine 22 and the pressure accumulator 20, makes it possible to recover energy during the deceleration and braking of the vehicle and can be used as a hydraulic booster drive of the drive motor 2 for the acceleration process, optionally in connection with a hydraulic starter for a start-stop function of the internal combustion engine 2.

In addition, with the additional hydraulic machine 22 in pumping operation, it is a simple matter to provide an additional braking moment to increase braking performance. The deceleration of the vehicle can easily be increased and the braking moment available can also be increased by the retarder function of the hydraulic machine 22 operating as a pump. In particular when the braking moment of the hydraulic pump 7 of the hydraulic work system 4 operating as a retarder is insufficient, an additional braking moment in the drive train 1 can therefore be easily generated by means of the hydraulic machine 22.

By means of the additional hydraulic machine 22 acting as a booster-retarder, it thereby becomes possible, using a hydraulic pump 7 with a smaller volumetric displacement, to supply the hydraulic work system 4 of a relatively heavy vehicle to perform recuperative braking by charging the pressure accumulator 20.

Moreover, the additional hydraulic machine 22, which functions as a booster retarder when it is being operated as a pump, makes it possible during a deceleration or braking process to increase the quantity of hydraulic fluid delivered into the pressure accumulator 20 during a deceleration or braking process compared to simply the retarder operation of the hydraulic pump 7 acting alone, so that the period in which, when the hydraulic machine 22 is being operated as a motor, an additional torque is introduced into the drive train 1 can be prolonged. The result is a significant decrease in the fuel consumption of a vehicle with the drive train 1.

The torque boost generated when the hydraulic machine 22 in being operated as a motor in the drive train 1 can be used to downsize the internal combustion engine 2 or to increase the traction power of the traction drive 3 and/or to utilize the transfer power of the hydraulic work system 4.

The hydraulic machine 22 which can be operated as a motor and a pump in the same direction of rotation entails relatively little additional construction effort and manufacturing cost, whereby in connection with a switching valve device 50 in the form of a three-position, four-connection valve, it is s simple matter to control the operation of the hydraulic machine as a pump or a motor.

The drive train 1, with the hydraulic machine 22 that can be operated as a pump and a motor by means of the switching valve device 50, in connection with the pressure accumulator 20, makes it possible to recover energy during the deceleration or braking of the vehicle and to have a hydraulic drive boost of the internal combustion engine 2 as a booster drive for the acceleration process and/or a hydraulic starter for a start-stop function of the internal combustion engine 2 with a stable, heavy-duty and economical construction.

In the drive train, a conventional hydraulic pump for the open circuit can be used for the hydraulic pump 7 of the hydraulic work system 4. In the case of a hydraulic pump 7 in the form of a variable displacement pump, for example, an axial piston pump with a unilaterally variable volumetric displacement can be used.

The invention is not limited to the exemplary embodiments described or illustrated.

The charge/discharge valve 30 and the switching valve device 50 for the control of the pumping and motor operation of the hydraulic machine 22 can be in the form of switched valves or control valves that perform a throttling action in intermediate positions.

It will be readily appreciated by those skilled in the art that modifications may be made to the invention without departing from the concepts disclosed in the foregoing description.

Accordingly, the particular embodiments described in detail herein are illustrative only and are not limiting to the scope of the invention, which is to be given the full breadth of the appended claims and any and all equivalents thereof.

The invention claimed is:

1. A drive train of a vehicle, comprising:
a drive motor comprising an internal combustion engine;
a traction drive driven by the drive motor, the traction drive having a primary unit driven by the drive motor; and
a hydraulic work system driven by the drive motor, wherein the hydraulic work system includes at least one hydraulic pump driven by the drive motor, and wherein during braking operation of the vehicle, the hydraulic pump of the hydraulic work system delivers into a hydraulic pressure accumulator for energy recovery,
wherein to deliver torque into the drive train and/or to absorb torque from the drive train the drive train includes an additional hydraulic machine unit which can be selectively placed in communication with the hydraulic pressure accumulator or a tank and is in the form of at least one hydraulic machine which is operable as a pump and a motor in the same direction of rotation, wherein the hydraulic machine has an inlet connection and an outlet connection and a switching valve device is provided to control connection of the inlet connection and the outlet connection with the pressure accumulator or the tank, and
wherein a charge/discharge valve is in selective communication with the pressure accumulator and the switching valve.

2. The drive train as recited in claim 1, wherein the switching valve device includes a motor operation position to deliver torque from the hydraulic machine into the drive train, in which the inlet connection is connected with the pressure accumulator and the outlet connection is connected with the tank.

3. The drive train as recited in claim 1, wherein the switching valve device includes a pumping operation position for the absorption of torque by the hydraulic machine from the drive train, in which the inlet connection is connected with the tank and the outlet connection is connected with the pressure accumulator.

4. The drive train as recited in claim 1, wherein the switching valve device includes a neutral circulation position in which the inlet connection is in communication with the outlet connection in an unpressurized circulation.

5. The drive train as recited in claim 1, wherein the switching valve device is a control valve in the form of a longitudinal slide valve, which is connected to a connecting line which is in communication with the pressure accumulator, to a tank line which is in communication with the tank, to an inlet line which is in communication with the inlet connection of the hydraulic machine, and to an outlet line which is in communication with the outlet connection of the hydraulic machine.

6. The drive train as recited in claim 1, wherein the charge/discharge valve has a charging position in which a delivery line of the hydraulic pump of the hydraulic work system is connected with an accumulator line connected to the pressure accumulator, and a discharge position in which the accumulator line is connected with a connecting line connected to the switching valve device.

7. The drive train as recited in claim 6, including a branch line connected to the delivery line and branches off from the connecting line, and wherein in the branch line there is a shutoff valve device in the form of a check valve that opens toward the delivery line.

8. The drive train as recited in claim 7, wherein in the delivery line, upstream of the connection of the branch line, there is a shutoff valve device in the form of a check valve that opens in the direction of the charge/discharge valve.

9. The drive train as recited in claim 1, wherein the hydraulic machine is a variable displacement unit with a unilaterally variable displacement volume.

10. The drive train as recited in claim 1, wherein the hydraulic machine is a fixed displacement unit with a fixed displacement volume.

11. The drive train as recited in claim 1, wherein the hydraulic machine is selected from an axial piston machine or a radial piston machine or a vane-type hydraulic motor.

12. The drive train as recited in claim 1, wherein the hydraulic machine is a gearwheel machine.

* * * * *